Sept. 9, 1958  M. C. BLY  2,851,411
ELECTROCHEMICAL GAS-TESTER
Filed July 13, 1955  2 Sheets-Sheet 2

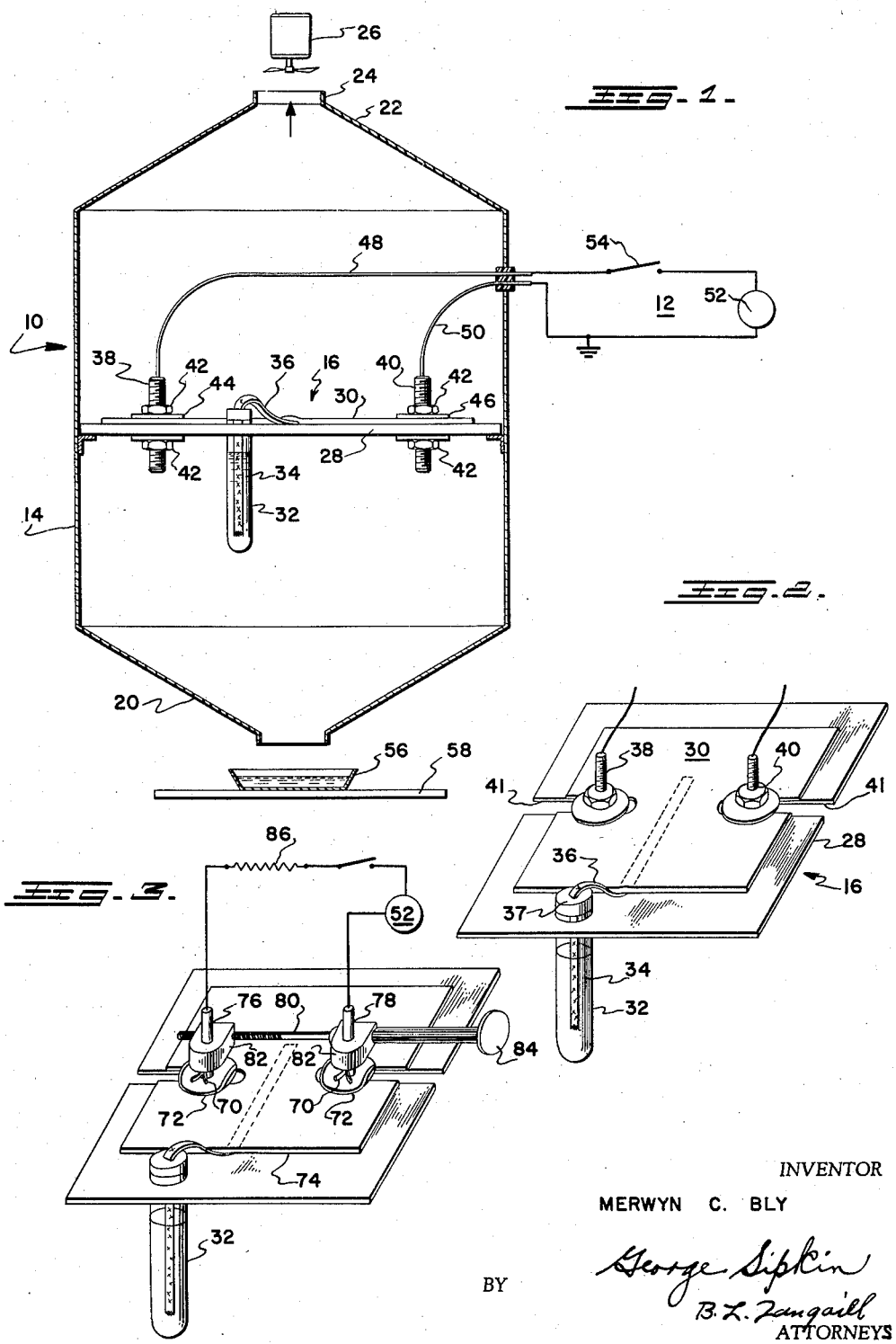

INVENTOR
MERWYN C. BLY
BY
George Sipkin
B. L. Zangwill
ATTORNEYS

United States Patent Office 2,851,411
Patented Sept. 9, 1958

2,851,411

ELECTROCHEMICAL GAS-TESTER

Merwyn C. Bly, Vienna, Va.

Application July 13, 1955, Serial No. 521,940

3 Claims. (Cl. 204—195)

(Granted under Title 35, U. S. Code (1952), sec. 266)

The invention described herein may be manufactured and used by or for the Government of the United States of America for governmental purposes without the payment of any royalties thereon or therefor.

This invention relates to electrochemical means and methods for testing a gas, or gaseous atmosphere, for certain characteristics, such as for example, the presence or concentration of a constituent of the gas or of a certain substance in the gas.

Equipment is known which uses an electrochemical principle for detecting or sensing substances carried by or in a gas. Such equipment comprises a means in the nature of an electric primary cell which is affected by the substance. An electric primary cell comprises an electrolyte and a pair of electrodes which are at different levels on the electromotive series. The gas to be tested contacts or envelops at least one of the electrodes; and it has been discovered that changes in the gas will affect the potential of that electrode. Detection is obtained by a measure of the effect of the gas on the electric potential of the electrode. Minute amounts of and changes in a constituent of a gas can be detected.

The exact theory or principles underlying the operation of equipment of this kind is not fully known; but details and operation of equipment of this kind are disclosed in U. S. Patents No. 2,156,693 issued to M. G. Jacobson on May 2, 1939; No. 2,278,248 issued to W. A. Darrah on March 31, 1942; and No. 2,401,287 issued to W. P. Yant et al. on May 28, 1946, as examples.

A primary object of the present invention is to provide a novel device and method for gas-testing of the kind described.

In general, equipment in accordance with the invention comprises a detecting or sensing device influenced by a characteristic of the gas and an indicating means through which the effect on the detecting device becomes manifest. The new detecting device includes a novel primary cell which comprises any two suitable electrodes interconnected by a compatible electrolyte. For detection, the gas to be tested envelops or contacts one or both of the electrodes. The indicating means may be any suitable circuitry, indicating instrument, recorder etc. that responds to the potentials of the electrodes of the primary cell.

Any of the more common materials used as electrodes for dry-type electric cells or batteries can be used in the invention. Carbon, copper, zinc, and lead have been successfully applied. Similarly it seems that any aqueous liquid can be used as the electrolyte. Results have been obtained with a large number of electrolytes. For examples, any one of the following can be used as an electrolyte: dilute hydrochloric acid, citric acid, sal ammoniac solution, copper sulphate solution; a liquid comprising lemon juice and sal soda, "Air-wick" and even simply iron rust in tap water.

Equipment in accordance with the invention is highly sensitive. Indications can be obtained when air is contaminated with a puff of cigarette smoke, Chinese punk smoke, burning paper, gasoline engine exhaust, carbon dioxide in fairly heavy concentration, ordinary "fumes" or vapor from perfume, cologne, chopped onions, narcissus blooms, mint and peppermint extract, fumes from hydrochloric acid, ammonia water, camphorated oil, "Clorox," limburger cheese, and others. Some electrolytes are more sensitive than others and will provide an indication in several seconds, although as much as a minute or more may sometimes be required in the interest of accuracy.

It appears that certain materials can be selective in operation. For example, a primary cell using iron rust in tap water as the electrolyte, and carbon and copper as the electrodes was very sensitive, i. e. shows high-speed response, to combustion products, such as for example tobacco smoke and smoke from wood, coal, oil etc.; but the cell was practically insensitive to many other air atmospheres comprising air contaminated with other ingredients.

A very important feature of the invention resides in the simple construction of the cell and in its manner of operation. At the present stage of development, it has been found that the sensitivity of cells utilizing the electrochemical principle of gas-testing generally is not stable. The potentials and response vary with time, and a stabilization period is usually necessary. By stabilization is meant a gradual decrease from a rapidly changing stage, usually extremely sensitive, to a more consistent stage, usually less sensitive, utilizable for reproducible indicating purposes. To reach this utilizable stage may require several hours or days or more of "aging" of the cell.

The nature of the electrolyte apparently considerably influences stabilization. Thus a saturated solution of sal soda as an electrolyte was quite sensitive to nearly all of the above mentioned contaminants tested but only during the early stages of stabilization. It apparently lost sensitivity rapidly after that. The stabilization time for this solution was several days. However strained lemon juice with about ten percent of a twenty percent solution of sal soda made an excellent electrolyte for general purposes with high sensitivity even after standing for nine months.

Apparently in order to avoid a long stabilization period, the aforesaid Darrah patent obtains indications through the use of two primary cells. One of the cells is enveloped or subjected to a "standard" or uncontaminated gas and the other cell is subjected at the same time to the same gas contaminated with the ingredient to be ascertained. The voltage of one cell is compared, in a manner, with that of the other; and in this way an indication of the contamination is determined. However, in accordance with the present invention, it is not necessary to use two cells, but a single cell is used.

In accordance with the invention, a ratio or percentage of indications is obtained from readings closely spaced in time; and thus a predetermined base line for magnitudes of indications is not necessary. A reading is obtained with an uncontaminated gas, and then a second reading is obtained shortly or immediately thereafter with the same gas as contaminated. The ratio of the two readings will then be an indication of the extent of the contamination. It has been found that results thus obtained repeat themselves over and over no matter what the degree of stabilization or "age" of the cell may be, so that the results are reliable and reproducible. This makes it possible to take readings practically at any time, so long as the readings are grouped in time; and a cell can be used without waiting long for it to stabilize, by which time it may lose its sensitivity. How closely readings should be taken depends on the stabilization time of a particular cell. Closely spaced readings should be taken when a cell is used having a rapid rate of decay of sensitivity; whereas more leisurely readings can be taken with a cell that changes slowly.

A general object of the invention is to provide a new device for use in the system of a type described which is extremely simple in construction, inexpensive to build, easy to operate, and quickly adaptable for use with different gases.

A further object of the invention is to provide a method for gas-testing of the kind described which makes it possible to test gases quickly and with reproducible comparative results.

Still another object of the invention is to provide a method of operation by means of which comparative indications can be obtained irrespective of chronological changes in the primary cell readings, so that equipment can be used without extended waiting for the cell to stabilize.

Other objects and many of the attendant advantages of this invention will be readily appreciated as the same becomes better understood by reference to the following detailed description when considered in connection with the accompanying drawings. In the drawings which are illustrative of the invention:

Fig. 1 is a view, partly in section and partly schematic, of equipment in accordance with the new invention;

Fig. 2 is a perspective view of a primary cell structure comprising a detecting device of the equipment;

Fig. 5 shows a curve obtained with equipment of Fig. 1 used for testing a perfume in air.

Figure 3:
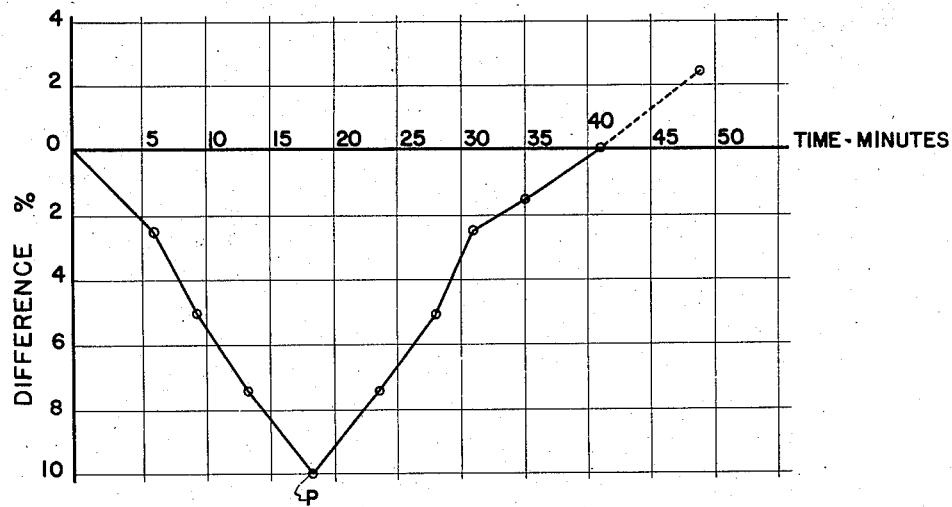
Fig. 3 is a perspective view of a modified form of a primary cell.

Referring to Figs. 1 and 2, equipment embodying the invention comprises a detecting device represented in its entirety by the reference numeral 10, and an indicating means represented in its entirety by the reference numeral 12.

The detecting device 10 comprises a casing 14 and a primary electric cell 16. A plurality of brackets are secured to the casing 14 for removably carrying the primary cell 16.

The casing or housing 14 comprises a rectangular main section with open lower and upper ends. The main section has a side which is preferably provided with an access door of adequate size to permit insertion and removal of the primary cell 16. The lower and upper ends of the main section have secured thereto, respectively, a lower flaring inlet 20 and a tapering outlet 22 terminating in an outlet pipe 24.

The gas to be tested tends to flow in the direction of the arrow shown in the outlet pipe 24. A suction fan 26 may be provided in or above the outlet 24 for creating a slight suction. However this fan 26 usually can be omitted.

An important feature of the invention resides in the simplicity of the primary cell construction. As shown in Figs. 1 and 2, the primary cell 16 of the preferred embodiment comprises a base block member 28 which serves as a stiff support for a liquid-porous and -absorbing material or absorbent sheet 30. Preferably the block 28 and sheet 30 are made of odorless electrically neutral material. A transparent polystyrene plastic has been found satisfactory for a block; and one or more layers of white blotting or filter paper is usually satisfactory as an absorbent sheet. The casing 14 is preferably made out of the same material that is used for the block 28 except that it is desirable to make the casing 14 opaque.

The sheet 30 serves as a carrier for the electrolyte and is maintained moist with the electrolyte by an suitable replenishing means. To this end, the block and sheet assembly is provided with a hole which receives a liquid-containing means in a form of a conventional glass test tube 32 which contains an electrolyte solution 34 or other liquid serving as the electrolyte. A wick 36 has its lower part immersed in the solution 34, and its upper part passes out of the tube 32, preferably through a suitable closure 37, and lays between the block 28 and the sheet 30 for keeping the sheet 30 moist.

A pair of spaced rod-electrodes 38 and 40 pass through the block 28 and sheet 30 through suitable elongated holes or slots 41 provided therein. These electrodes are preferably threaded for receiving nuts 42 by means of which the electrodes are securely fastened to the block and sheet assembly. Preferably washers 44 and 46, respectively, of the same material as the electrode-rods 38 and 40, are interposed between an upper nut 42 and the sheet 30 for better electrical contact with the electrolyte permeating the sheet; and similarly washers can be interposed between the lower nuts 42 and block 28 for mechanical reasons.

Insulated conductors 48 and 50 extend, respectively, from the electrodes 38 and 40, and can be electrically intimately associated or connected thereto in any suitable manner. The conductors 48 and 50 pass through any suitable small aperture in the casing 14 to the indicating means 12 which comprises a circuit including a micro-ammeter 52 and a control switch 54 of any suitable form. Since it is not usually known whether the reading taken when the air is contaminated will deflect the instrument to the left or to the right, it is desirable to have the instrument 52 of the center zero type, but this refinement is not essential.

Equipment as described is relatively inexpensive, small and compact. Thus, for example, a main casing, such as 14, having a size seven inches long by three by two inches across was used successfully, the length dimension being in a direction between inlet and outlet. The cell loosely fitted between a pair of opposite sides of the casing, but was spaced about one-fourth inch, more or less, from the other pair of opposite sides. The thickness of the base block 20 was one-fourth inch.

In operation, equipment is set up with the sheet 30 wetted and is permitted to "age" for several days, more or less. As a rule the deflection of the instrument 52 will change during the aging period, and when the change is less than about five percent in several hours, or in that approximate ratio, the equipment is ready for use. In general, the equipment is ready for use when the aging change in deflection is considerably less than changes produced by contaminated gas, as later described, during the test period.

Assuming that the equipment has been aged with uncontaminated air or other testable gas permeating the detecting device 10, the instrument 52 will have a certain deflection at the time. This deflection is noted, and is designated the reference or initial deflection.

The contaminant or contaminated gas is then introduced at the inlet 20. For convenience, a cup 56 on a support 58 and under the inlet 20 may be provided for receiving contaminant.

As the contaminated gas diffuses through or even floats through the detecting device, in contact with one or both of the electrodes 38 and 40, the deflection of the instrument changes and provides a measure of the extent of contamination. Periodic readings are taken, either of time required for each predetermined change of deflection, or of the deflection at the end of each consecutive time interval, the intervals preferably being of equal duration. The percentage deviation of each reading from the reference reading is noted and the time therefor. A curve can then be drawn of percentage deviation, or ratio, against time. The deviations indicate the extent of the changes of the contaminant or ingredient in the gas, and the curve provides a basis of analysis in the lack of standardized units for a device of this kind.

Figure 4:
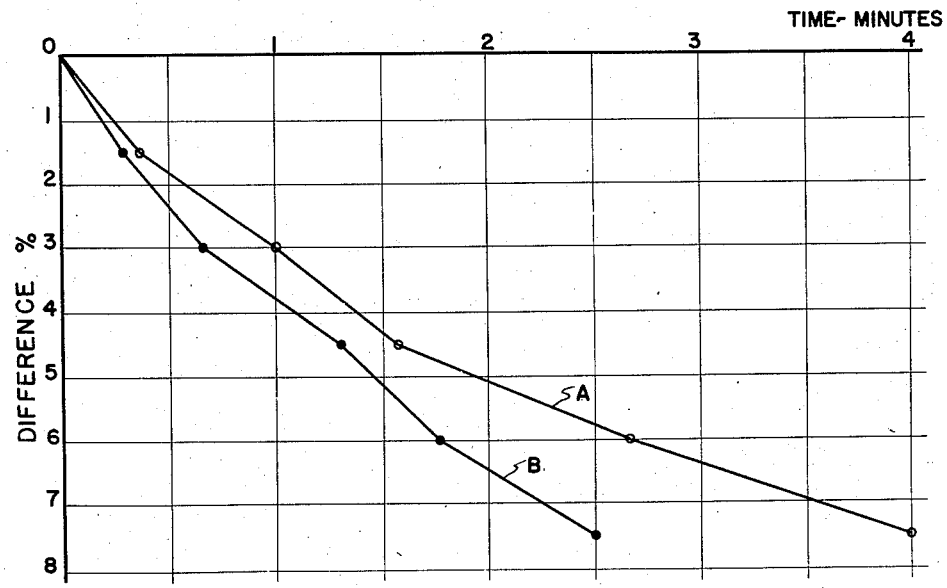
Fig. 4 shows comparative curves obtained with equipment of Fig. 1 used for testing air contaminated with smoke from two different brands of cigarettes burning in the air.

Figs. 4 and 5 represent curves obtained in accordance with the above method of operation. The curves of Fig. 4 were obtained with a cell having electrodes of zinc and copper and an electrolyte of a strained lemon juice saturated with sal soda, the sal soda also preventing fungus growth. The curve of Fig. 5 was obtained with the same electrolyte but with a carbon anode and zinc cathode for electrodes. In both cases air was the gas tested.

In Fig. 4, the abscissae represent time in minutes, and the ordinates represent the percentages that readings taken after time zero differed from the reference reading taken at time zero. Curve A was obtained immediately after a lighted cigarette of a popular brand was placed in cup 56; and curve B was similarly obtained with a second brand. These curves repeated themselves upon later testing. The fan 26 can be used to clear the atmosphere in the detecting device 14 between each group of readings.

In Fig. 5, the abscissae repersent time in minutes; and the ordinates the same as that of Fig. 4. The curve of Fig. 5 was obtained with perfume in the cup 56. The cup was removed at time P, about eighteen minutes after time zero. It is to be observed that as the perfume "odor" increased in concentration, the percentage deflection increased; and this percentage deflection began to restore to the reference deflection after the perfume was removed and the air cleared.

An important aspect of the invention resides in the fact that the curves duplicate themselves with tests spaced apart in time. Reproducible curves have been obtained with tests one year apart. It seems, however, extremely important that the equipment, and especially the electrical circuits be substantially the same for duplicate tests. Of special significance is the resistance of the measuring circuit including the instrument 52. If a resistor is to be inserted in the circuit, it is recommended that it have a constant temperature coefficient and be of the fixed resistance variety.

The foregoing curves were obtained with equipment of the size previously described. Although the figures showing the equipment are not intended to be to scale, they are indicative of the principal features of the invention in a simple form. Such equipment is easy to handle and use, and is simple in construction and set-up. At any time it is easy to replace a cell with one having different electrodes or electrolyte or both.

From the cell shown in Fig. 2 it is evident that the spacing between the electrodes can be manually adjusted. This adjustment is desirable for keeping the indication of the instrument 52 in a utilizable region of its scale. The cell can be constructed with any suitable means for more conveniently adjusting such spacing. One such construction is shown in Fig. 3, wherein cotter pins 70 replace the securing nuts 42. The weight of the electrodes provides an adequate force for contact between the washers 72 and absorbent material 74 which contains the electrolyte. The edges of the washers 72 are turned up so that the electrodes 76 and 78 can slide more readily on the material 74. Adjustment is obtained by providing one or both of the electrodes with a horizontal lead screw 80 of insulating material fitting oppositely threaded nuts 82 on the electrodes. The lead screw has a manually turnable knob 84 which when turned adjusts the distance between the electrodes.

The adjustment is also desirable in order to obtain an arrangement providing an approximately maximum deflection of the instrument 52 as a zero reference reading. A replaceable resistor 86 is provided in the circuit of the indicating means for bringing this maximum zero reference reading within the desired region of the scale of the instrument.

Obviously many modifications and variations of the present invention are possible in the light of the above teachings. It is therefore to be understood that within the scope of the appended claims the invention may be practiced otherwise than as specifically described.

What is claimed is:

1. A testing device of a type described comprising a casing having a gas space therein and a gas-inlet and a gas-outlet for said space, a flat assembly comprising an insulating base and a wettable absorbent sheet carried by said base, means for wetting said sheet with an electrolyte, electrode means comprising a first and a second electrode carried in spaced relation by said assembly in contact with said sheet with portions of each of said electrodes being on the same side of said sheet, and supporting means secured to said casing and supporting said assembly across said casing, the cross-sectional area of said casing being greater than the area of said assembly thereat, whereby gas can pass through said casing, said portions of said electrodes being exposed in said space for envelopment by gas in said space.

2. A testing device as defined in claim 1 but further characterized by said wetting means comprising a container for electrolyte and a wick.

3. Testing means as defined in claim 1 but further characterized by said casing being opaque.

References Cited in the file of this patent

UNITED STATES PATENTS

| | | |
|---|---|---|
| 2,156,693 | Jacobson | May 2, 1939 |
| 2,278,248 | Darrah | Mar. 31, 1942 |
| 2,401,287 | Yant et al. | May 28, 1946 |
| 2,464,087 | Jacobson | Mar. 8, 1949 |

FOREIGN PATENTS

| | | |
|---|---|---|
| 681,399 | Great Britain | Oct. 22, 1952 |